G. HEALES & W. R. NEALL.
AUTOMOBILE ADVERTISING DEVICE.
APPLICATION FILED APR. 20, 1908.
926,186.
Patented June 29, 1909.
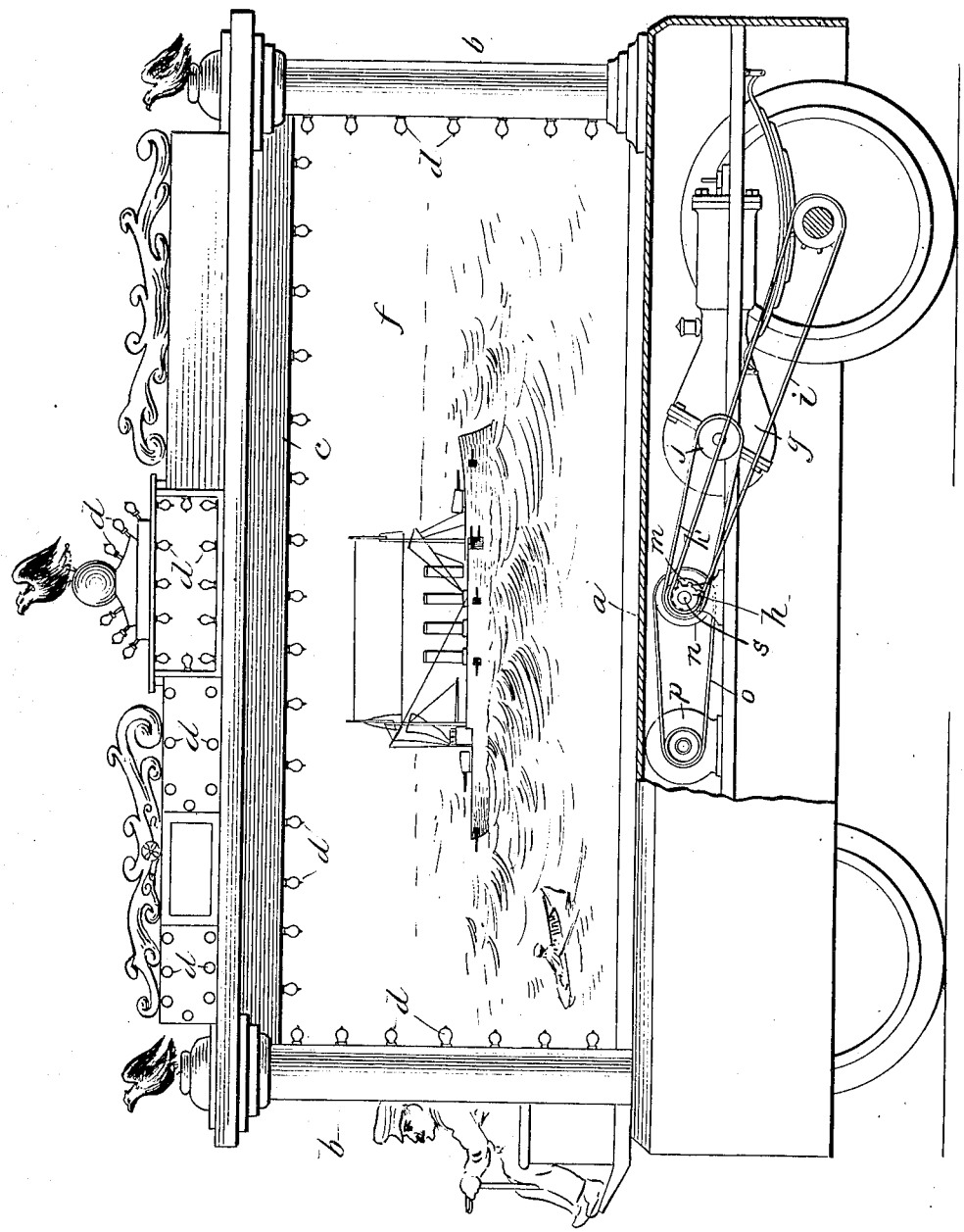

UNITED STATES PATENT OFFICE.

GEORGE HEALES AND WALTER R. NEALL, OF BALTIMORE, MARYLAND.

AUTOMOBILE ADVERTISING DEVICE.

No. 926,186.          Specification of Letters Patent.          Patented June 29, 1909.

Application filed April 20, 1908. Serial No. 428,200.

*To all whom it may concern:*

Be it known that we, GEORGE HEALES, a subject of the King of Great Britain, and WALTER R. NEALL, a citizen of the United States, both residing in Baltimore, Baltimore City county, State of Maryland, have invented certain new and useful Improvements in Automobile Advertising Devices; and we do hereby declare the following to be a full, clear, and exact description of the invention, such as will enable others skilled in the art to which it appertains to make and use the same.

The object of the invention is to provide a wheeled advertising vehicle, provided with apparatus preferably in the form of an electric lighting system for illuminating the vehicle and the advertisements carried thereby, said advertisements conveniently taking the form of interchangeable or renewable signs attached to the vehicle, associated with a set scene or picture which may also be changed as desired.

In the accompanying drawing, the figure represents an automobile vehicle embodying a convenient form of the invention.

Referring to the drawing, *a* represents the body or chassis of an automobile vehicle provided with suitable traction wheels and provided with a superstructure comprising upright columns *b* at each corner which support a canopy *c*. The body of the vehicle, together with the superstructure is provided with numerous blank spaces to receive suitable advertising matter and disposed about the entire structure in any desired relation are electrical incandescent lights *d*, which serve to illuminate the vehicle and the advertisements thereon. On top of the vehicle and within the canopy, there is arranged a suitable set scene, in the present instance, comprising a waterscape or marine scene which is produced by stretching canvas loosely over a framework carried by the vehicle body and painted thereon the representation of waves. The movement of the vehicle will also produce a wave-like motion of the canvas due to the fact that the latter is mounted loosely on the vehicle and therefore capable of vibration. Instead of the particular scenic effect indicated, any other desired scene involving figures or the like, illustrative or indicative of the matter advertised, may be employed.

In order to propel the vehicle and to furnish power for the lights, there is mounted on the vehicle a suitable motor *g* which may conveniently take the form of an explosive gas engine which is controlled by the usual mechanism provided for such machines. On the engine shaft is mounted a driving pulley *h* which is connected by belt *k* to a pulley *m* on a counter shaft *s*. A driving chain *i* connects the sprocket *h* on shafts *s* with a sprocket on the rear axle of the vehicle. Also mounted on shaft *s* is a pulley *n* which serves to drive a dynamo or electric generator *p* by means of belt *o*, said dynamo being appropriately connected by suitable conducting circuits to the lamps *d*. It will be understood, of course, that suitable clutches are associated with sprocket *h* and pulley *n* and disconnect the same and the countershaft *s*.

The control of the engine and the lighting circuits and of the vehicle is effected by an operator who occupies a seat in the front part of the vehicle and by means of the usual steering and controlling apparatus, such as are commonly used in automobile vehicles. It will also be understood that, in lieu of the motor propelled vehicle described and illustrated, we may employ a vehicle propelled by horse power or any other suitable means and likewise may be substituted for the electric lighted system shown any other appropriate form of illumination.

What we claim as our invention is:—

An advertising apparatus comprising a wheeled vehicle having an open-sided canopy-like superstructure, a set scene arranged longitudinally and centrally below the canopy and exposed through the open sides, electric lights around the top and side edges of the canopy to light up said scene, a motor for operating the vehicle and a generator for the lights also operated from said motor.

In testimony whereof we affix our signatures, in presence of two witnesses.

GEORGE HEALES.
WALTER R. NEALL.

Witnesses:
FRANK GRASSER,
NATTES S. GRIMES.